(12) United States Patent
Cote (10) Patent No.: US 9,631,768 B1
(45) Date of Patent: Apr. 25, 2017

(54) VERTICAL POST OR POLE ASSEMBLY

(71) Applicant: Paul L. Cote, Knowlton (CA)

(72) Inventor: Paul L. Cote, Knowlton (CA)

( * ) Notice: Subject to any disclaimer, the term of this patent is extended or adjusted under 35 U.S.C. 154(b) by 0 days.

(21) Appl. No.: 15/053,577

(22) Filed: Feb. 25, 2016

(51) Int. Cl.
*F16M 11/22* (2006.01)
*E02D 27/42* (2006.01)
*E04H 12/22* (2006.01)

(52) U.S. Cl.
CPC ............. *F16M 11/22* (2013.01); *E02D 27/42* (2013.01); *E04H 12/2238* (2013.01); *E04H 12/2261* (2013.01); *E04H 12/2269* (2013.01)

(58) Field of Classification Search
CPC ..... F16M 11/22; E02D 27/42; E04H 12/2238; E04H 12/2261; E04H 12/2269
USPC ....................................................... 248/159
See application file for complete search history.

(56) References Cited

U.S. PATENT DOCUMENTS

| | | | | |
|---|---|---|---|---|
| 2,605,067 A | * | 7/1952 | Lindsell | A47G 33/12 248/176.1 |
| 2,919,941 A | * | 1/1960 | Bohlman | A61G 7/0503 108/147.19 |
| 3,955,787 A | * | 5/1976 | Brown | A47F 5/13 211/196 |
| 5,718,344 A | * | 2/1998 | Joldeson | A47F 5/13 211/182 |
| 6,191,355 B1 | * | 2/2001 | Edelstein | E04H 12/08 174/45 R |
| 7,331,882 B1 | * | 2/2008 | White | A63B 63/083 473/479 |
| 2009/0302186 A1 | * | 12/2009 | Puleo | A47G 33/12 248/523 |
| 2016/0123522 A1 | * | 5/2016 | Hahn | A63B 71/023 248/523 |

* cited by examiner

*Primary Examiner* — Anita M King
(74) *Attorney, Agent, or Firm* — Dennis L. Thomte; Thomte Patent Law Office LLC (57) ABSTRACT

A vertically disposed post or pole which is comprised of a lower tube having upper and lower ends and an upper tube having upper and lower ends. The lower tube has a swaged upper end portion which is configured to receive the lower end of the upper tube. A novel connection structure is provided which ensures that the upper and lower tubes will be perfectly aligned when connected together. A plurality of the upper and lower tubes may be joined together if so desired.

10 Claims, 8 Drawing Sheets

VERTICAL POST OR POLE ASSEMBLY

BACKGROUND OF THE INVENTION

Field of the Invention

This invention relates to a vertical post or pole assembly and more particularly relates to a novel means for joining upper and lower tubes of a post or pole together in a manner which ensures that the post or pole assembly will be straight when so joined. More particularly, this invention enables the upper and lower tubes of a post or pole assembly to be easily joined together.

Description of the Related Art

There is always a problem when a vertical post or pole is formed with tubular sections that are attached to one another in an end-to-end manner. Usually, in such a situation, one end of one tubular section is swaged or reduced in diameter so that it will fit into the regular end of a second tubular section. The problem which occurs with the above described method of joining the two tubular sections together is that there are variances in the fit between the swaged and regular end of the tubular sections. These variances may cause a loose fit or a fit that is too tight. If the variances in fit between the sections are on the loose side, the post or pole will curve to one side. If the variance is too tight, the sections will not assemble correctly.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A vertical post or pole (hereinafter post) assembly is disclosed. The assembly includes a hollow lower tube having an upper end and a lower end with the lower tube having a swaged or reduced diameter upper end portion with upper and lower ends. The lower end of the swaged upper end portion defines an annular shoulder. The upper end of the swaged upper end portion has first, second, third and fourth spaced-apart slots formed therein which extend downwardly into the upper end thereof. The first, second, third and fourth slots are radially spaced-apart 90 degrees from one another. Each of the first, second, third and fourth slots have an open upper end and a lower end. The lower ends of the first and third slots dwell in the same vertical plane. The lower ends of the second and fourth slots dwell in the same vertical plane. The lower ends of the first and third slots dwell in a vertical plane below the vertical plane of the lower ends of the second and fourth slots.

The assembly also includes a hollow upper tube having an upper end and a lower end with the upper tube having the same diameter as the lower tube whereby the lower end of the upper tube may be slipped downwardly onto the swaged upper end portion. The lower end of the upper tube engages the annular shoulder when the lower end of the upper tube is slipped downwardly onto the swaged upper end portion of the lower tube.

The assembly also includes an elongated and horizontally disposed first pin, having first and second ends, with the first pin being positioned in and secured to the upper tube above the lower end thereof. The assembly further includes an elongated and horizontally disposed second pin, having first and second ends, with the second pin being positioned in and secured to the upper tube above the first pin. The second pin is disposed transversely with respect to the first pin. The first and second ends of the first pin are received by the first and third slots respectively when the lower end of the upper tube is slipped downwardly onto the swaged upper end portion of the lower tube. The first and second ends of the second pin are received by the second and fourth slots respectively when the lower end of the upper tube is slipped downwardly onto the swaged upper end portion of the lower tube.

In the preferred embodiment, the upper tube has first and second openings formed therein which receive the first and second ends of the first pin respectively. The upper tube has third and fourth openings formed therein which receive the first and second ends of the second pin respectively. In the preferred embodiment, the first and second ends of the first and second pins are welded to the upper tube but they could be secured to the upper tube by any convenient means such as press-fitting, etc. In the preferred embodiment, the upper ends of the first, second, third and fourth slots are tapered.

A plurality of the upper and lower tubes may be selectively removably secured together in an end-to-end relationship.

It is therefore a principal object of the invention to provide an improved post or pole assembly.

A further object of the invention is to provide an improved post or pole assembly which is comprised of two or more sections which are joined together in a manner wherein the sections are perfectly aligned with respect to one another.

A further object of the invention is to provide an improved post or pole assembly which is easily assembled.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
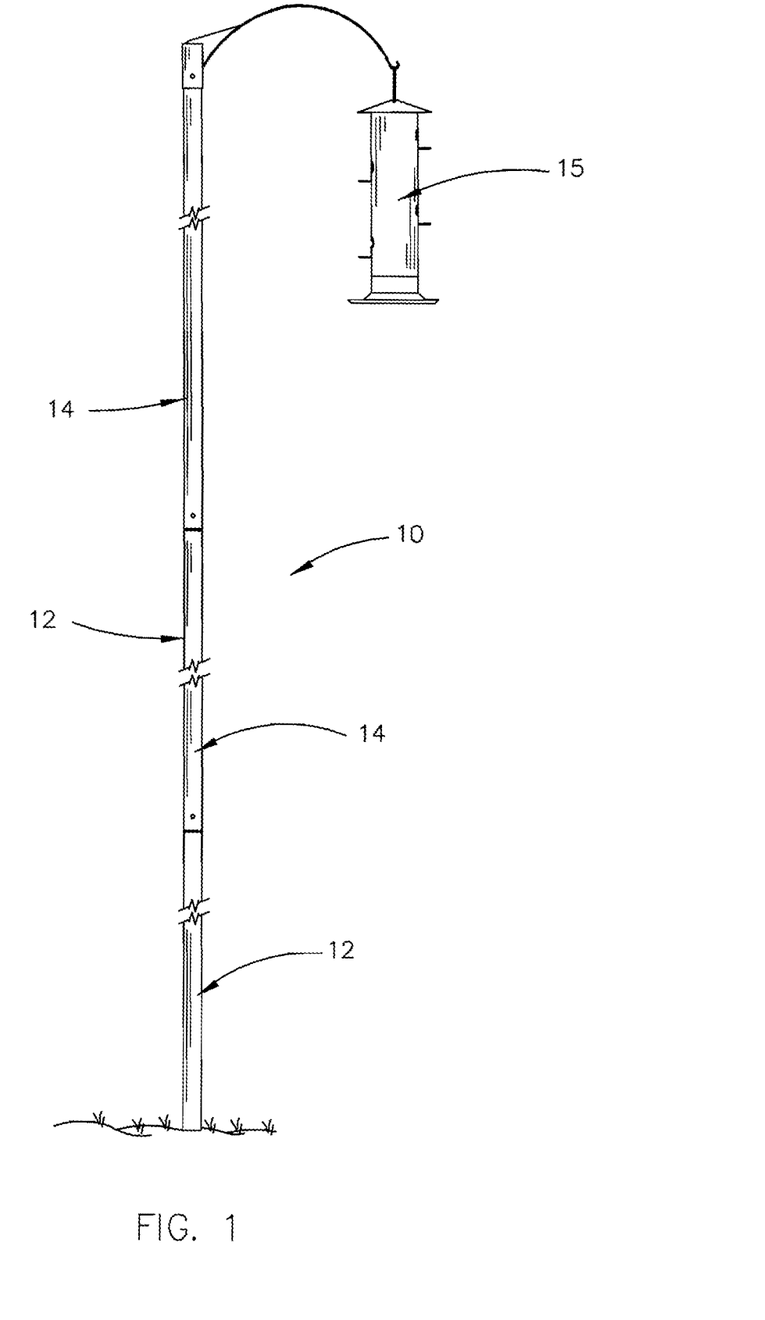
FIG. 1 is a side view of the vertical post or pole assembly of this invention.
Figure 2:
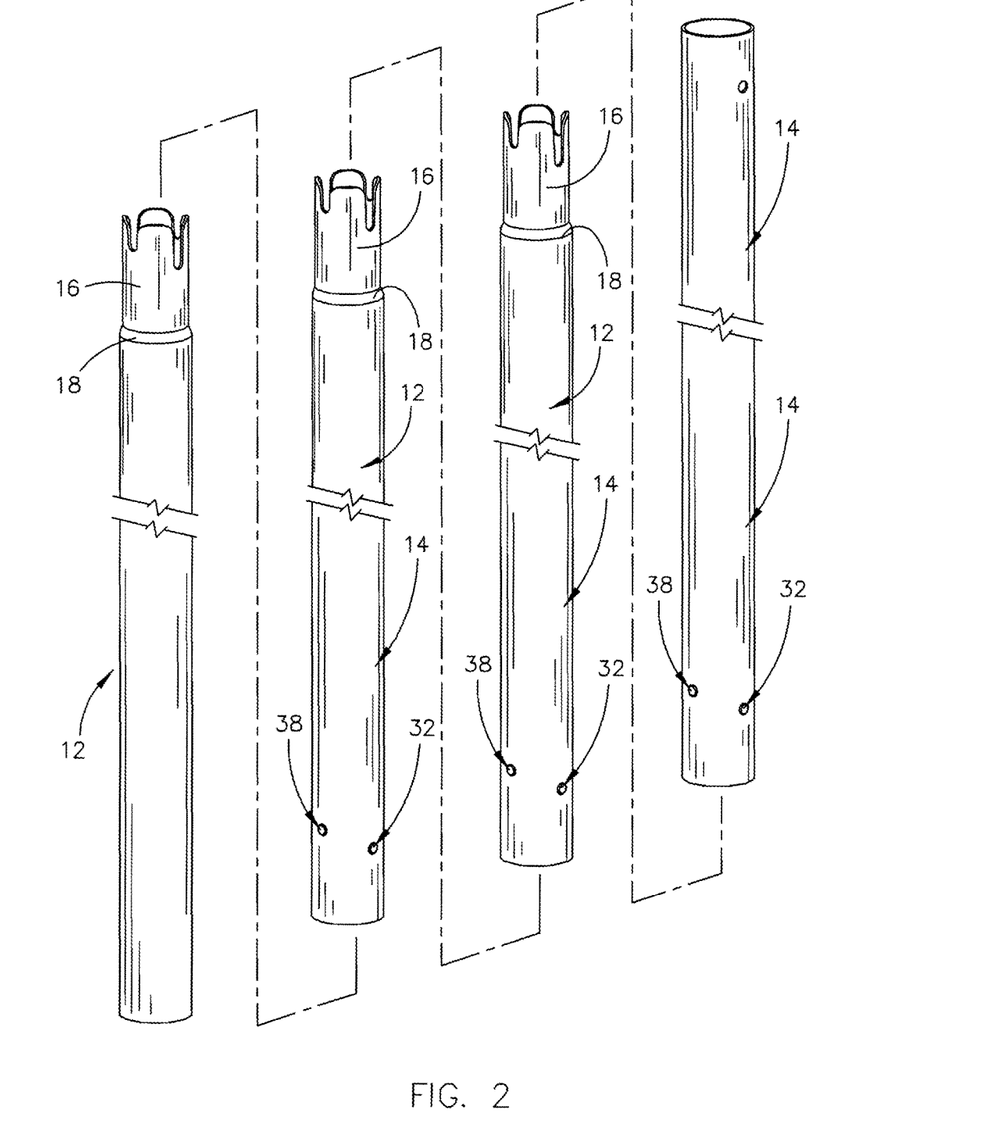
FIG. 2 is an exploded perspective view of the vertical post or pole assembly of this invention.
Figure 3:
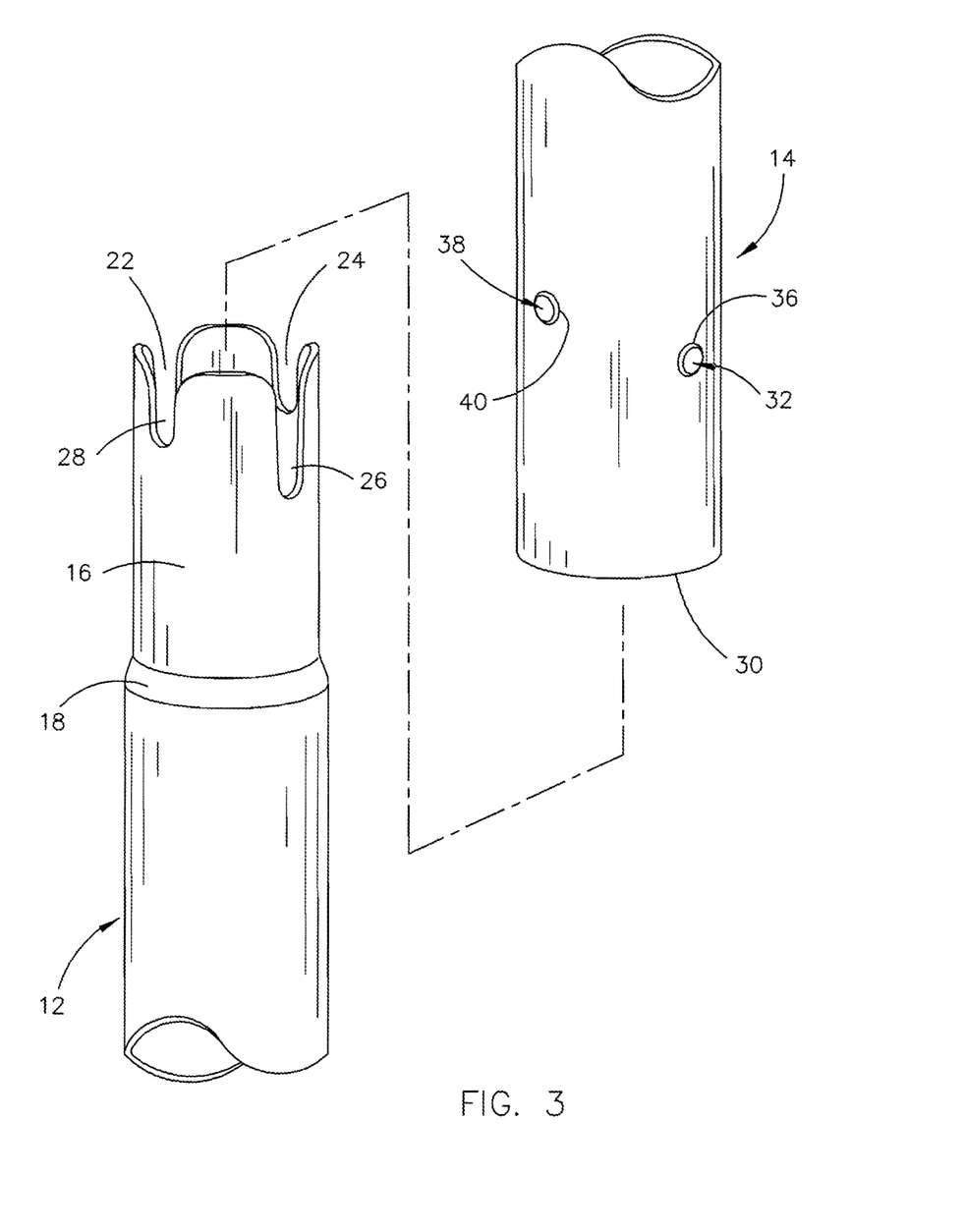
FIG. 3 is a partial exploded perspective view of the post or pole assembly of this invention.
Figure 4:
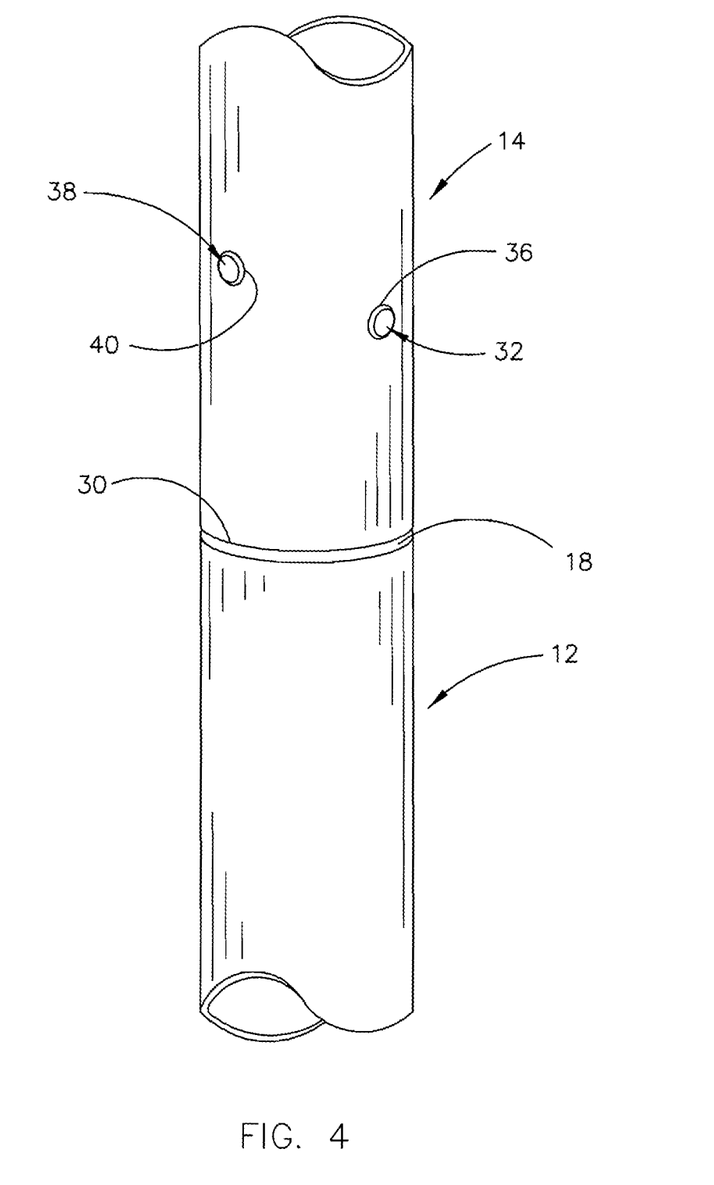
FIG. 4 is a partial perspective view of the post or pole assembly of this invention.
Figure 5:
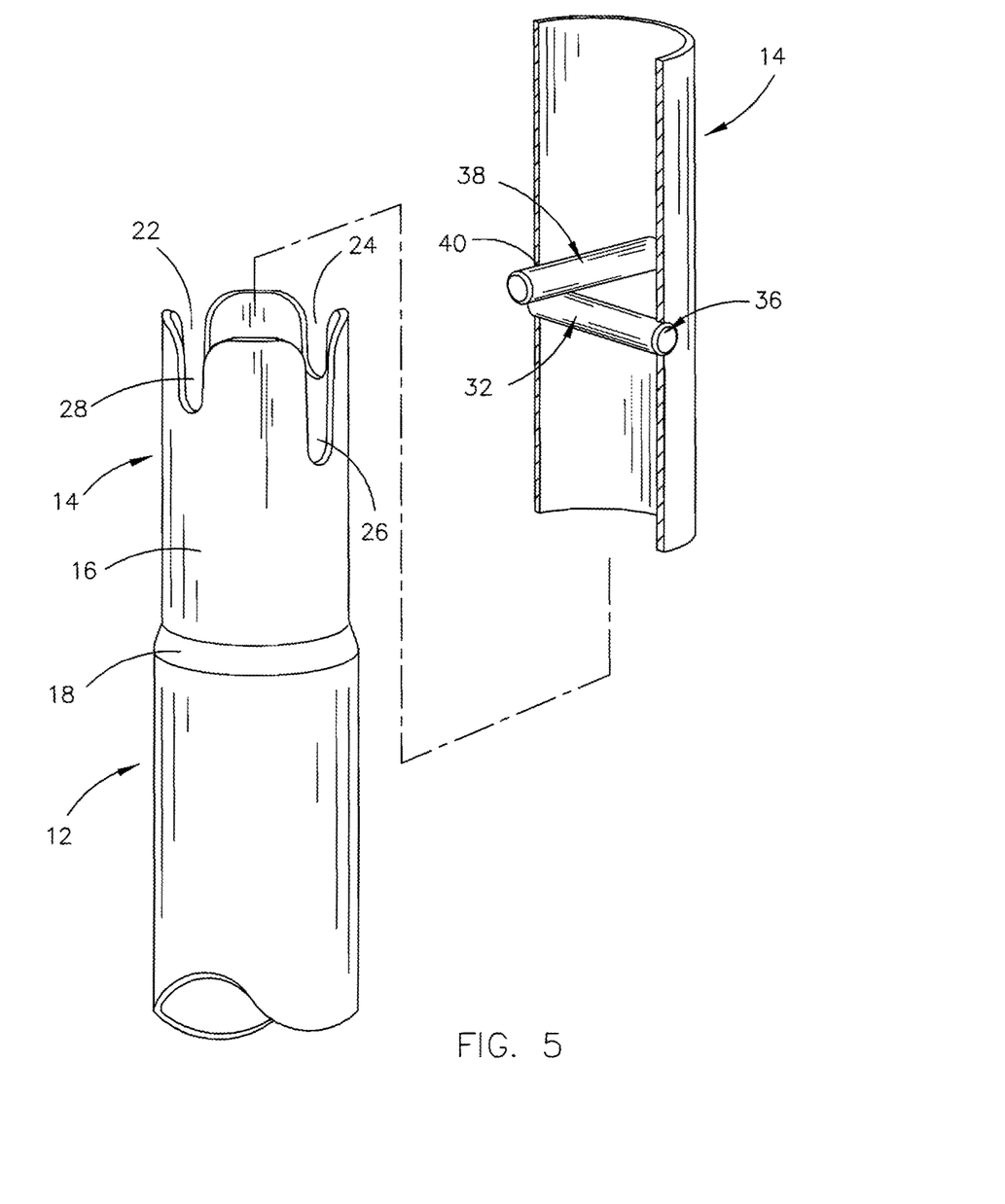
FIG. 5 is a partial exploded perspective view of the post or pole assembly of this invention.
Figure 6:
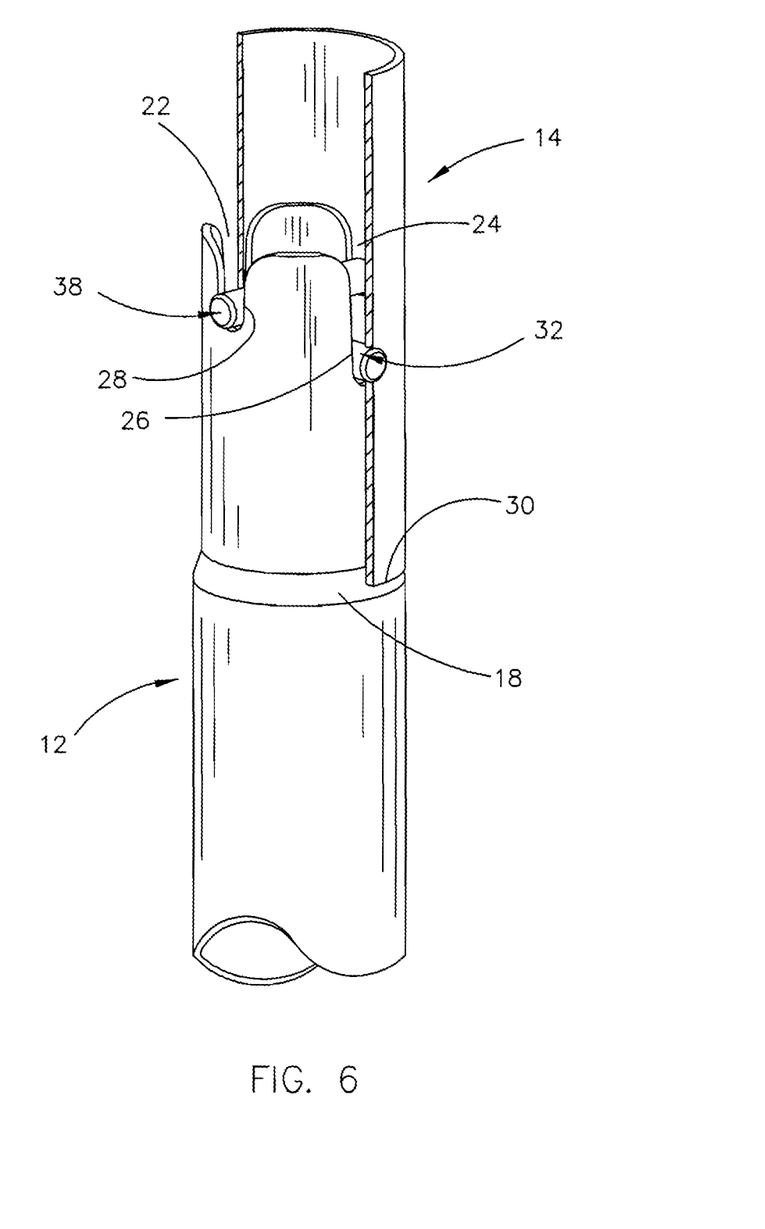
FIG. 6 is a partial perspective and sectional view of the post or pole assembly of this invention.
Figure 7:
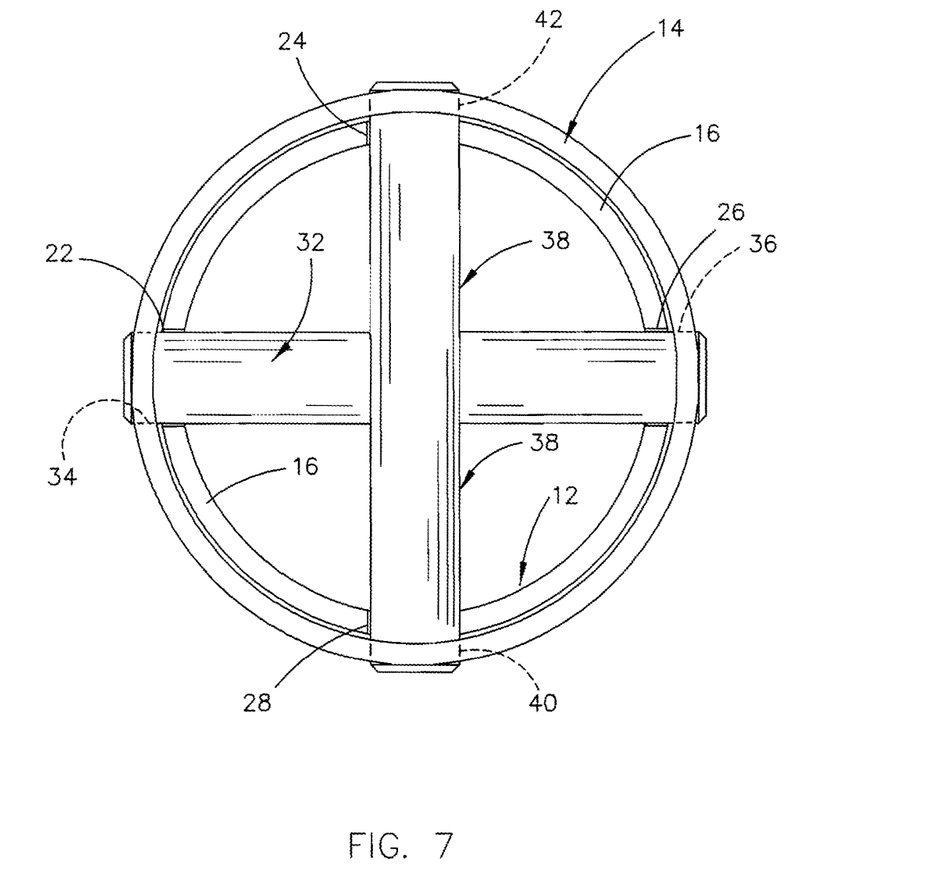
FIG. 7 is an upper view of the post or pole assembly of this invention.

The numeral 10 refers to a vertically disposed post or pole which is comprised of at least a first tube 12 and a second tube 14. In some posts or poles, there may be a plurality of tubes 12 and 14 joined together as seen in FIGS. 1 and 2. The post or pole 10 of FIG. 1 may be used to support a bird feeder 15 or other objects at the upper end thereof.

The lower end of the lowermost tube 12 of post 10 may be driven into the ground, embedded in concrete, or secured to a supporting surface as will be described hereinafter. Tube 12 has a swaged portion 16 at its upper end which has a diameter less than the diameter of the tube 12. The swaged portion 16 forms an annular shoulder 18 at the lower end thereof. The upper end 20 of swaged portion 16 has four slots 22, 24, 26 and 28 formed therein which extend downwardly thereinto from the upper end thereof. Slots 22 and 26 are radially spaced apart 180 degrees. Slots 24 and 28 are also radially spaced-apart 180 degrees. Each of the slots 22, 24, 26 and 28 are radially spaced-apart 90 degrees. Preferably, the upper ends of the slots 22, 24, 26 and 28 are tapered to facilitate the connection of tubes 12 and 14 as will be described in greater detail hereinafter.

For purposes of description, tube 14 will be described as having a lower end 30. The diameter of tube 14 is the same as the diameter of the main portion of tube 12.

The numeral 32 refers to a horizontally disposed pin which has its ends received by openings 34 and 36 formed in tube 14. The ends of pin 32 are secured to tube 14 by welding, press-fitting or the like. The numeral 38 refers to a horizontally disposed pin which has its ends received by openings 40 and 42 formed in tube 14. The ends of pin 38 are secured to tube 14 by welding, press-fitting or the like. As seen, pins 32 and 38 are disposed transversely with respect to one another.

The tube 14 is connected to tube 12 as will now be described. The lower end of tube 14 is slipped downwardly onto the swaged portion 16 in a manner so that the ends of pin 32 are received in slots 22 and 24 and so that the ends of pin 38 are received by slots 24 and 28. The tube 14 is lowered onto tube 12 until the lower end 30 of tube 14 engages shoulder 18. At that time, the pin 32 will be positioned at the lower ends of slots 22 and 26 and the pin 38 will be positioned at the lower ends of slots 24 and 28. The tapered upper ends of the slots 22, 24, 26 and 28 assist in the reception of the pins 32 and 38 in their respective slots.

Thus, when assembled, the engagement of the lower end of tube 14 with the shoulder 18 serves as a first point of contact between the tubes 12 and 14. The contact of the pins 32 and 38 with their respective slots serves as a second point of contact between the tubes 12 and 14. Therefore, North and South movement between the tubes 12 and 14 is presented as well as East and West movement. Perfect alignment of the tubes 12 and 14 is created preventing any movement between the tubes 12 and 14.

Figure 8:
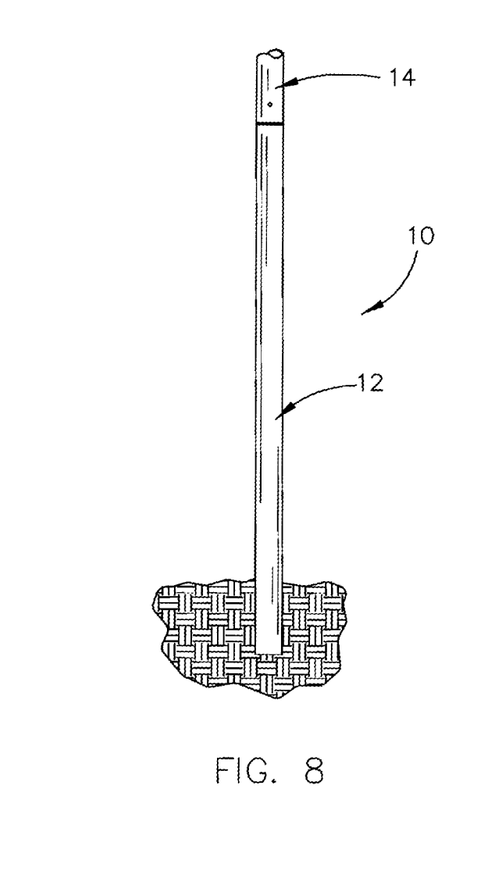
FIG. 8 is a side view of the post or pole assembly of this invention with the lower end embedded into the ground.
Figure 9:
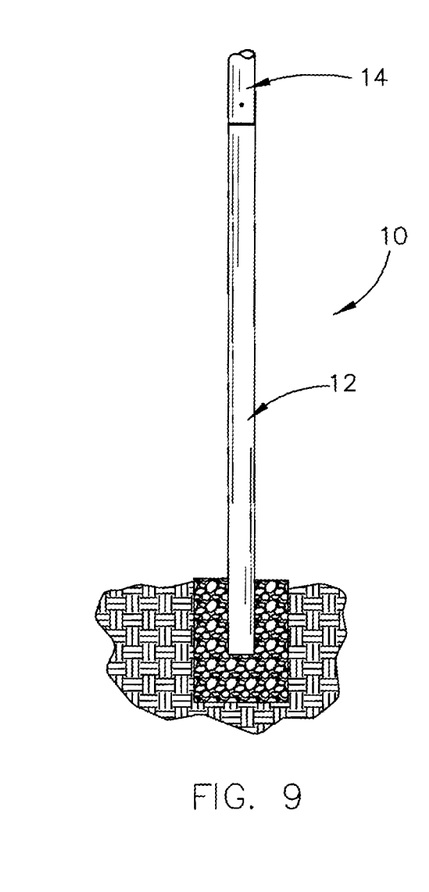
FIG. 9 is a side view of the post or pole assembly of this invention with the lower end thereof embedded in concrete.
Figure 10:
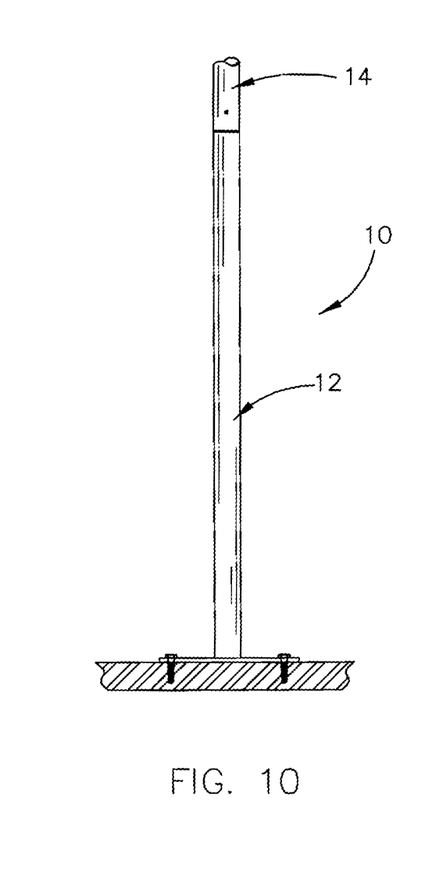
FIG. 10 is a side view of the post or pole assembly of this invention wherein the lower end thereof being secured to a horizontally disposed support surface by a bracket secured to the lower end of the post or pole.

The lower end of the post or pole 10 may be embedded in the ground as seen in FIG. 8 or may be embedded in concrete as seen in FIG. 9. Further, the post or pole 10 may have a bracket at its lower end which is bolted to a supporting surface as seen in FIG. 10.

A plurality of the upper and lower tubes may be selectively removably secured together in an end-to-end relationship.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A vertical post assembly, comprising:
   a hollow lower tube having an upper end and a lower end;
   said lower tube having a swaged upper end portion with upper and lower ends;
   said lower end of said swaged upper end portion defining an annular shoulder;
   said upper end of said swaged upper end portion having first, second, third and fourth spaced-apart slots extending downwardly into said upper end of said swaged upper end portion;
   said first, second, third and fourth slots being radially spaced-apart 90 degrees from each other;
   each of said first, second, third and fourth slots having an open upper end and a lower end;
   said lower ends of said first and third slots dwelling in the same vertical plane;
   said lower ends of said second and fourth slots dwelling in the same vertical plane;
   said lower ends of said first and third slots dwelling in a vertical plane below the vertical plane of said lower ends of said second and fourth slots;
   a hollow upper tube having an upper end and a lower end;
   said upper tube having the same diameter as said lower tube whereby said lower end of said upper tube may be slipped downwardly onto said swaged upper end portion of said lower tube;
   said lower end of said upper tube engaging said annular shoulder when said lower end of said upper tube is slipped downwardly onto said swaged upper end portion of said lower tube;
   an elongated and horizontally disposed first pin having first and second ends;
   said first pin being positioned in and secured to said upper tube above said lower end thereof;
   an elongated and horizontally disposed second pin having first and second ends;
   said second pin being positioned in and secured to said upper tube above said first pin;
   said second pin being disposed transversely with respect to said first pin;
   said first and second ends of said first pin being received by said first and third slots respectively when said lower end of said upper tube is slipped downwardly onto said swaged upper end portion of said lower tube; and
   said first and second ends of said second pin being received by said second and fourth slots respectively when said lower end of said upper tube is slipped downwardly onto said swaged upper end portion of said lower tube.

2. The vertical post assembly of claim 1 wherein said upper tube has first and second openings formed therein which receive said first and second ends of said first pin respectively and wherein said upper tube has third and fourth openings formed therein which receive said first and second ends of said second pin respectively.

3. The vertical post assembly of claim 2 wherein said first and second ends of said first and second pins are welded to said upper tube.

4. The vertical post assembly of claim 1 wherein said upper ends of said first, second, third and fourth slots are tapered.

5. The vertical post assembly of claim 1 wherein each of said first and second pins are cylindrical.

6. A vertical pole assembly, comprising:
a hollow lower tube having an upper end and a lower end;
said lower tube having a swaged upper end portion with upper and lower ends;
said lower end of said swaged upper end portion defining an annular shoulder;
said upper end of said swaged upper end portion having first, second, third and fourth spaced-apart slots extending downwardly into said upper end of said swaged upper end portion;
said first, second, third and fourth slots being radially spaced-apart 90 degrees from each other;
each of said first, second, third and fourth slots having an open upper end and a lower end;
said lower ends of said first and third slots dwelling in the same vertical plane;
said lower ends of said second and fourth slots dwelling in the same vertical plane;
said lower ends of said first and third slots dwelling in a vertical plane below the vertical plane of said lower ends of said second and fourth slots;
a hollow upper tube having an upper end and a lower end;
said upper tube having the same diameter as said lower tube whereby said lower end of said upper tube may be slipped downwardly onto said swaged upper end portion;
said lower end of said upper tube engaging said annular shoulder when said lower end of said upper tube is slipped downwardly onto said swaged upper end portion of said lower tube;
an elongated and horizontally disposed first pin having first and second ends;
said first pin being positioned in and secured to said upper tube above said lower end thereof;
an elongated and horizontally disposed second pin having first and second ends;
said second pin being positioned in and secured to said upper tube above said first pin;
said second pin being disposed transversely with respect to said first pin;
said first and second ends of said first pin being received by said first and third slots respectively when said lower end of said upper tube is slipped downwardly onto said swaged upper end portion of said lower tube; and
said first and second ends of said second pin being received by said second and fourth slots respectively when said lower end of said upper tube is slipped downwardly onto said swaged upper end portion of said lower tube.

7. The vertical pole assembly of claim 6 wherein said upper tube has first and second openings formed therein which receive said first and second ends of said first pin respectively and wherein said upper tube has third and fourth openings formed therein which receive said first and second ends of said second pin respectively.

8. The vertical pole assembly of claim 7 wherein said first and second ends of said first and second pins are welded to said upper tube.

9. The vertical pole assembly of claim 6 wherein said upper ends of said first, second, third and fourth slots are tapered.

10. The vertical pole assembly of claim 6 wherein each of said first and second pins are cylindrical.

\* \* \* \* \*